Jan. 30, 1923.

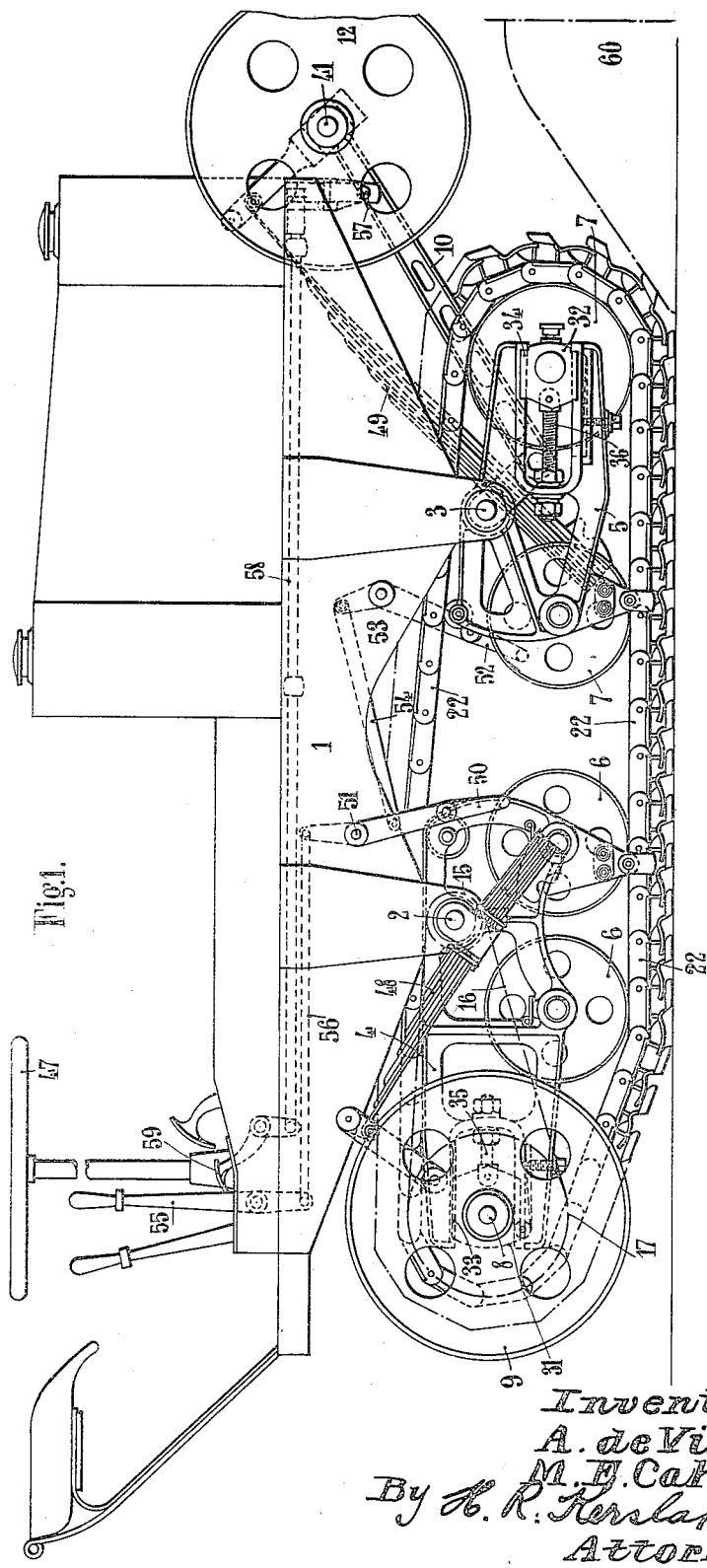

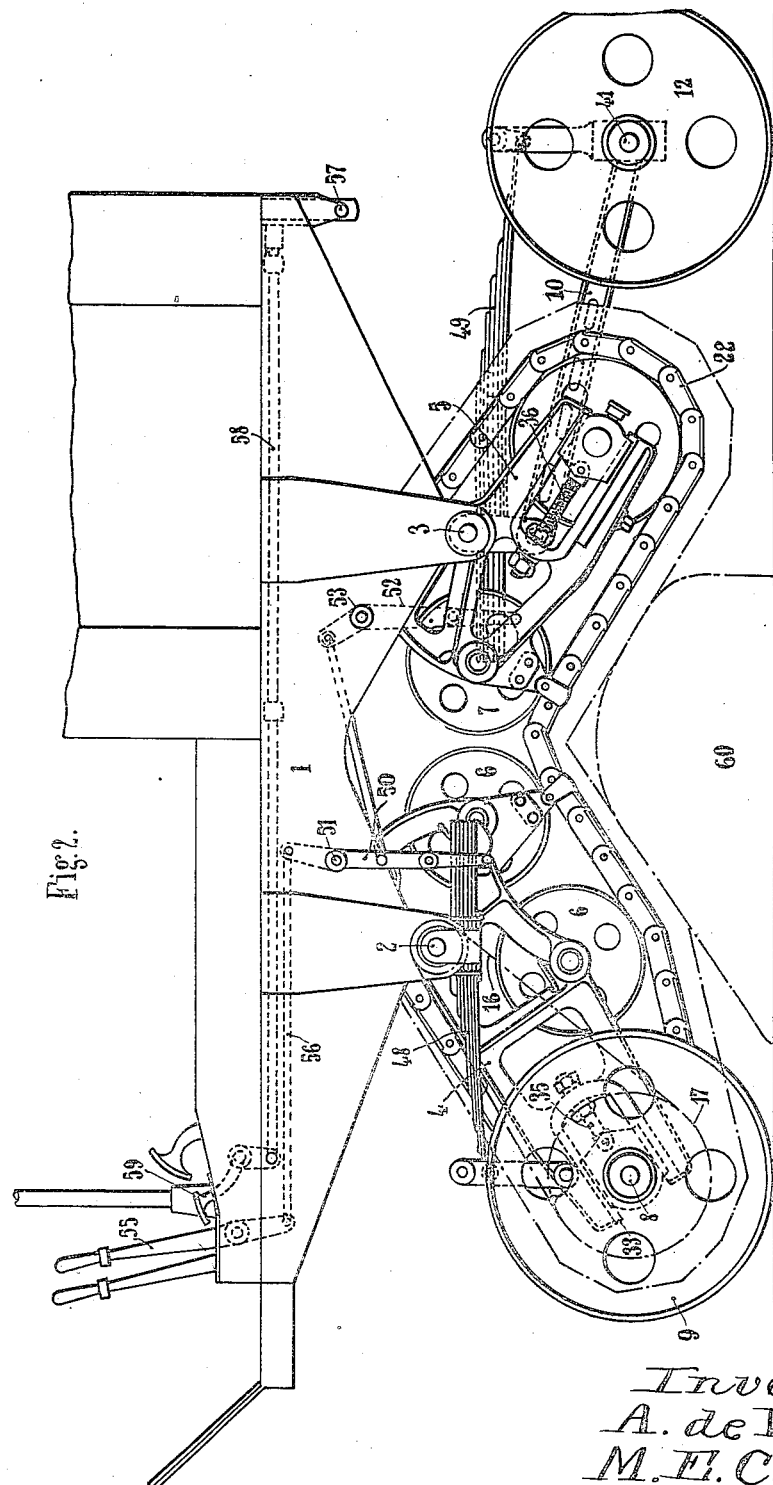

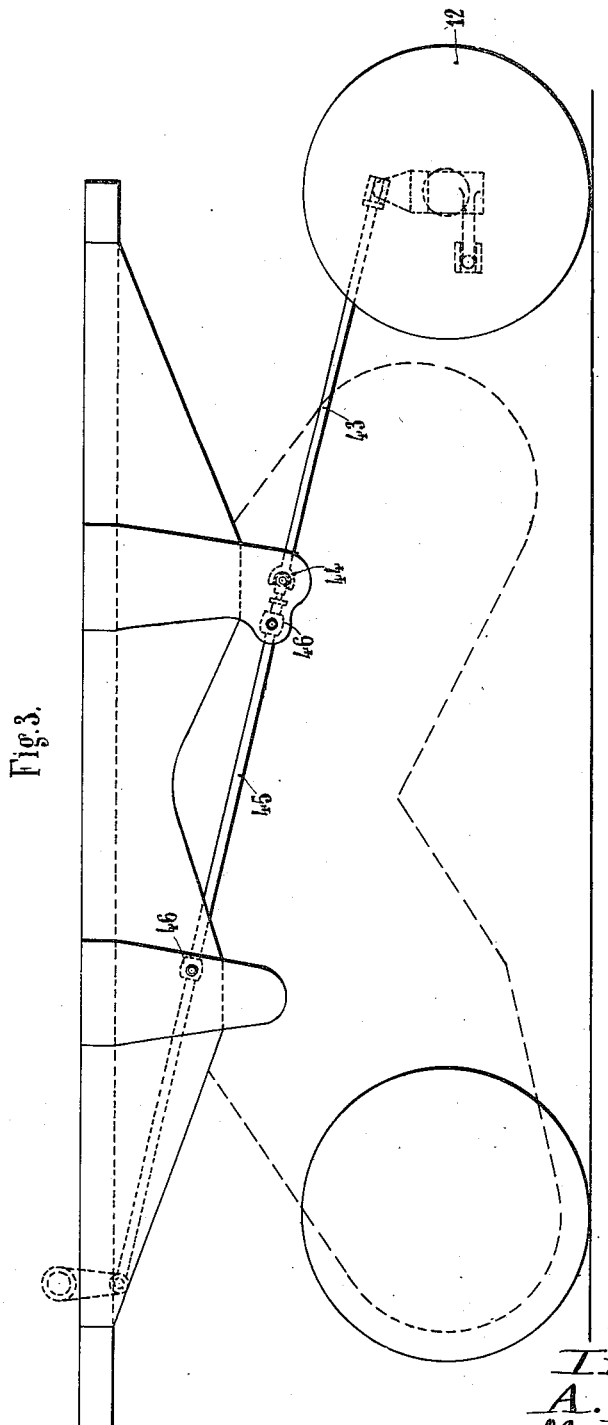

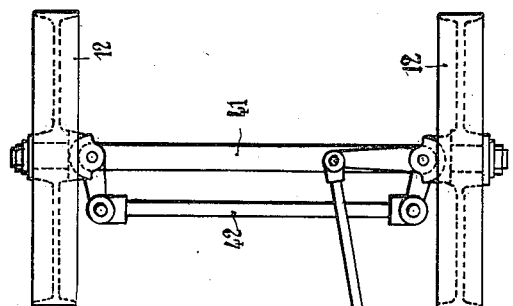
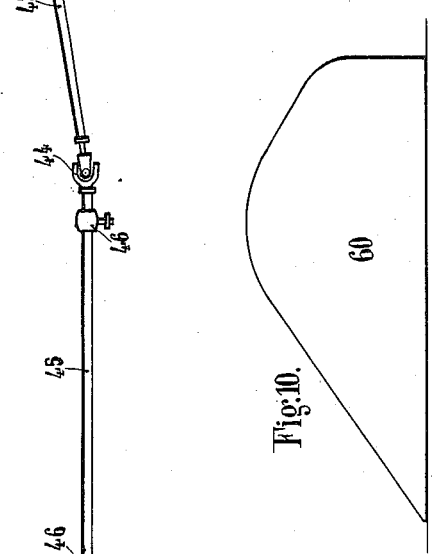
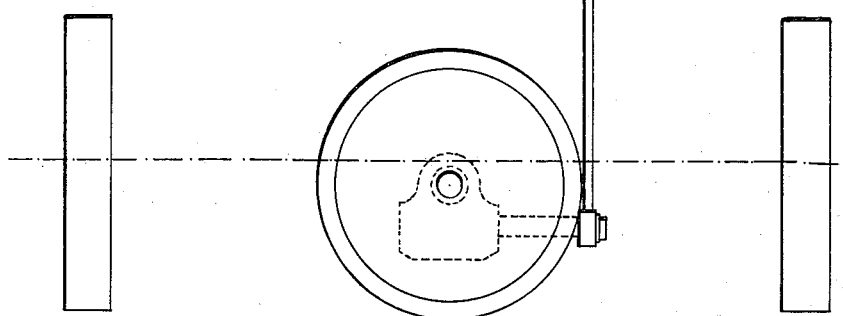

A. DE VIREL ET AL.
TRACTOR.
FILED AUG. 27, 1920.

Inventors
A. de Virel
M. E. Cahen
By H. R. Kerslake
Attorney

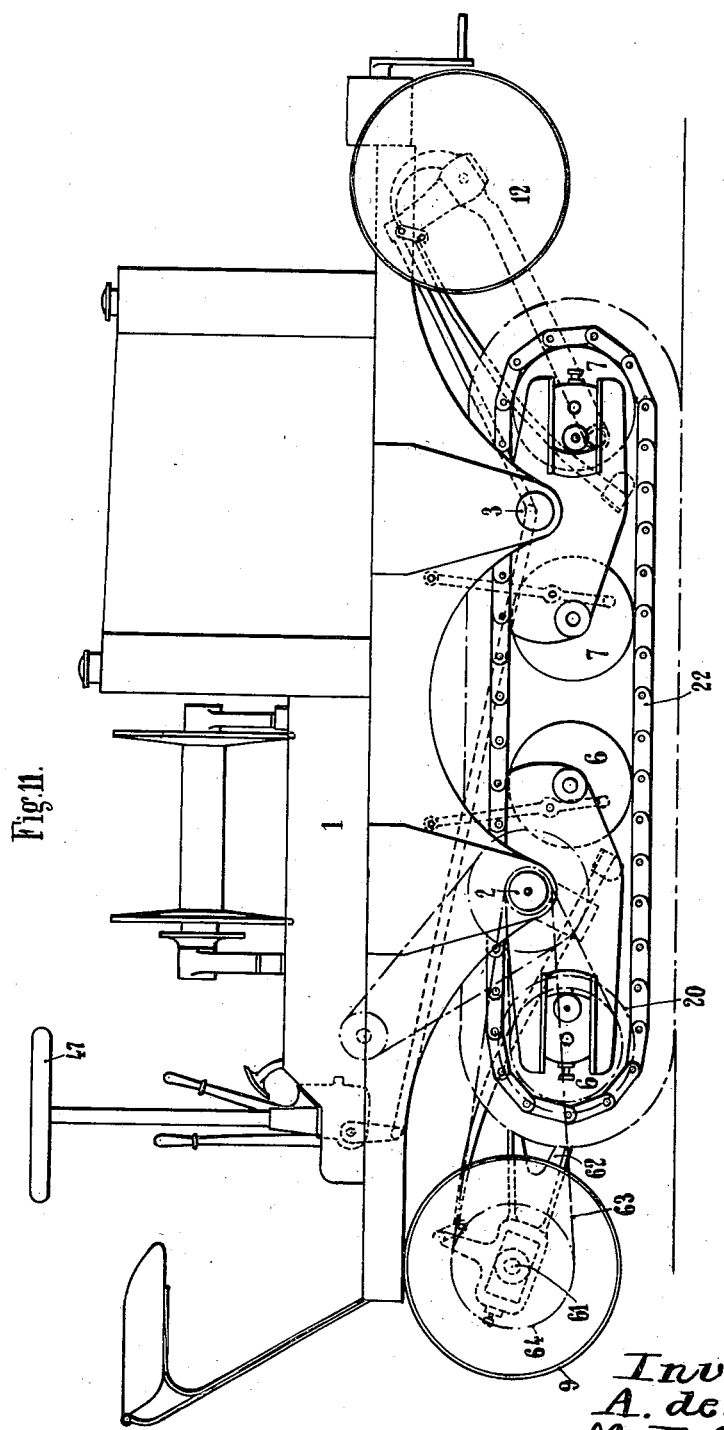

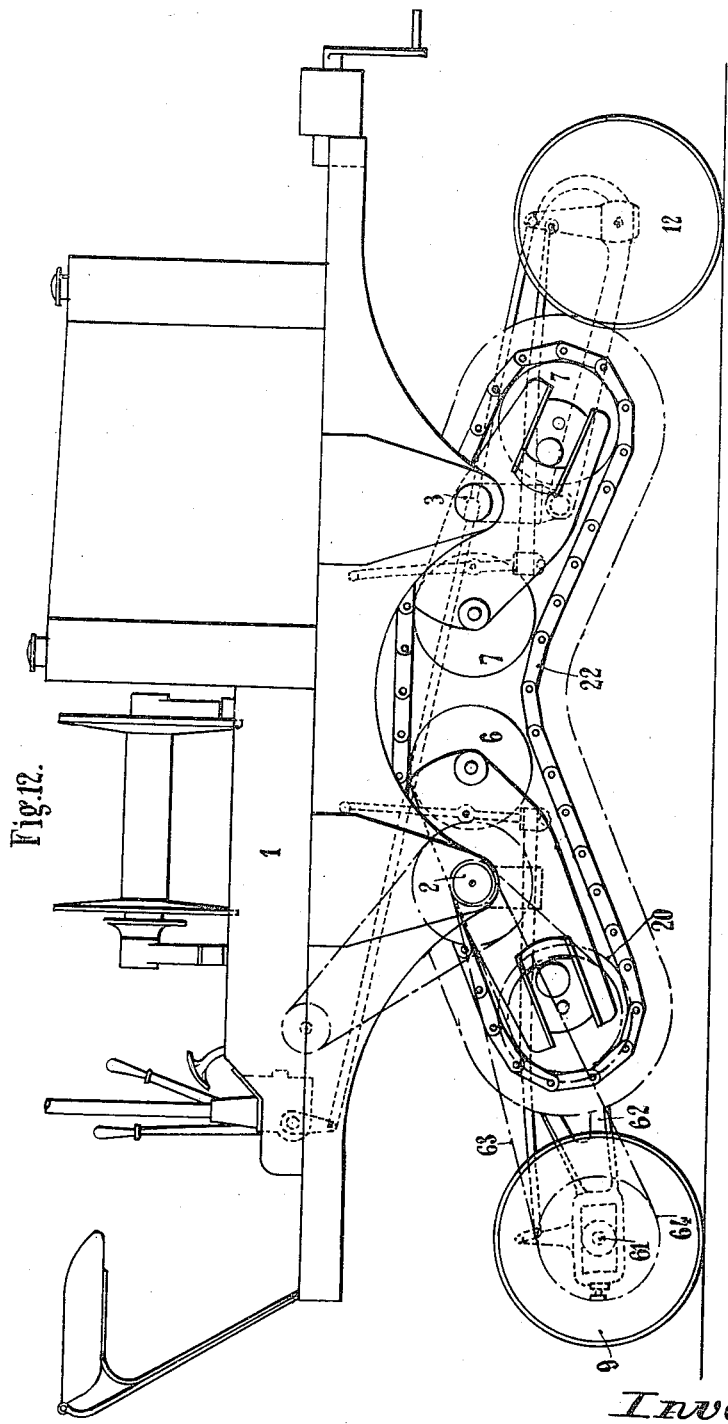

Patented Jan. 30, 1923.

1,443,619

UNITED STATES PATENT OFFICE.

ALBAN DE VIREL AND MARCEL EUGÈNE CAHEN, OF PARIS, FRANCE.

TRACTOR.

Application filed August 27, 1920. Serial No. 406,283.

*To all whom it may concern:*

Be it known that we, ALBAN DE VIREL and MARCEL EUGÈNE CAHEN, both French citizens, and residents of 111 Avenue Victor Hugo, Paris, France, have invented a certain new and useful Tractor, of which the following is a specification.

This invention relates to a vehicle adapted for operation at will and according to the nature of the ground, either by tractor chain or by wheels, and characterized in that the sprocket wheel for the chain and the carrying wheel of the vehicle are mounted upon the same shaft, and the change from one method of propulsion to the other is effected automatically by the act of simply clearing an obstacle or a wedge shaped member of suitable profile.

In the accompanying drawings:

Fig. 1 is a side elevation of the tractor in forward movement upon the endless chain member.

Fig. 2 is a side elevation of the same tractor moving upon wheels.

Fig. 3 is an elevation showing the arrangement of the mechanism employed for steering purposes.

Fig. 4 is a plan view of the same.

Fig. 10 represents the profile of the obstacle of the most suitable shape to be cleared when passing from one method of propulsion to the second.

Figs. 11 and 12 show a modification of the tractor in forward movement upon the member or upon wheels, in which the driving wheel is not mounted upon the same shaft as the sprocket wheels for the members.

In these drawings, 1 represents the vehicle frame having mounted thereon an internal combustion engine and its accessory parts, and carrying a rear axle 2 and a front axle 3 having pivoted thereto the wheel trucks or carriages 4 and 5 containing the wheels 6 and 7.

Figure 5:
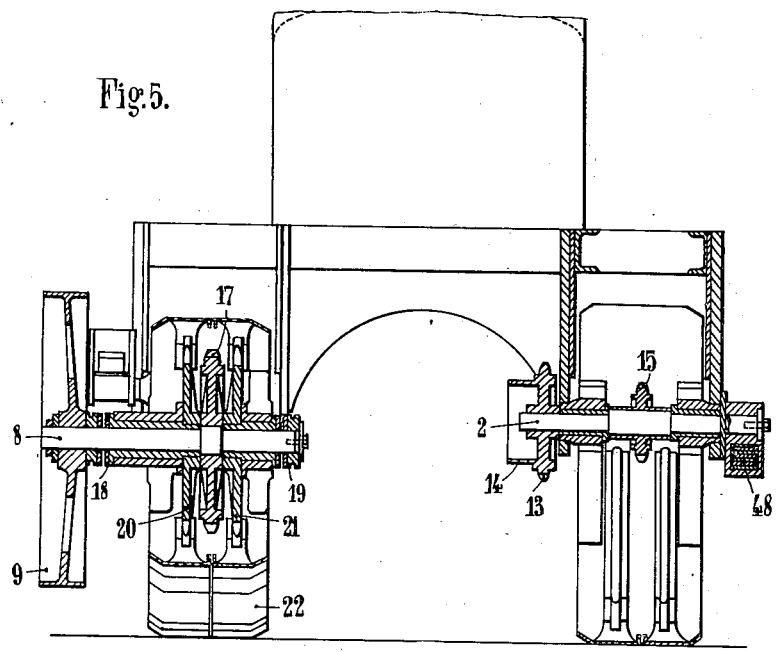
Fig. 5 is a cross section through the shaft of the sprocket wheels and the axis of pivotation of the wheel trucks.

The rear wheel truck 4 carries the shaft 8 of the driving wheels 9. Upon the front axle 3 is pivoted the assemblage constituted by the arm 10, the steering wheels 12 and their springs. The wheels 9 and 12 are employed to support the tractor when the latter is required to travel upon the said wheels. The power of the engine is transmitted to the rear axle 2 by means of the sprocket wheel 13 (Fig. 5). The axle 2 transmits this movement to the shaft 8 by means of a sprocket wheel 15, a chain 16 and a sprocket wheel 17.

The axle 8 carries the jaw clutch sleeves 18 and 19 actuated by any suitable means which permit of coupling to the sprocket wheel 17 either the driving wheels 9 or the sprocket wheels 20 and 21 mounted on the same shaft 8 and actuating the member 22 when the vehicle travels upon the latter instead of upon the wheels.

Figure 7:
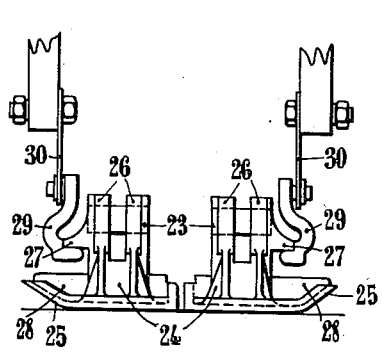
Figs. 6 and 7 are details of the chain.
Figure 6:
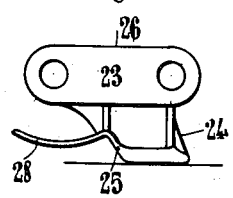

The endless traction member or chain is constituted by the link elements 23 (Figs. 6 and 7) connected together by cross pins upon which they are pivoted, and connected by the brackets 24 to the shoes 25, these latter members being in a single piece. In the present example, the shoes are formed of two half shoes disposed exactly opposite each other and each containing its link of the chain having engaging therein the propelling wheels 20 and 21, but the pairs of half shoes can if desired constitute one and the same piece. The top surface of the said links forms the rolling path or carrying rail, and the outer face of the links has a suitable profile in order to afford a projection 27 constituting a sliding way for the carrying rail.

The shoe 25 carries an extension 28 situated at a higher level whereby this latter portion may be above the ground level when the shoe rests upon a hard soil in a firm manner but will come in contact with the ground when the shoe sinks into soft ground. The member 22 is held constantly in a position nearly in contact with the wheels 6 and 7 of the trucks by means of a carrying device comprising the brackets 29 having friction surfaces or rollers and engaging under the projections 27 of the links 23, being pivoted at their upper ends to the plates 30 secured to the trucks 4 and 5. This device will allow the chain to move around the said trucks even when the assemblage is entirely suspended.

Figure 8:
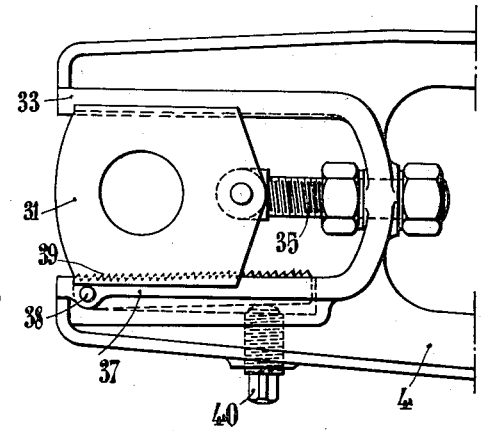
Figs. 8 and 9 are details of the device employed for stretching the chain, and of the safety brake for the same.
Figure 9:
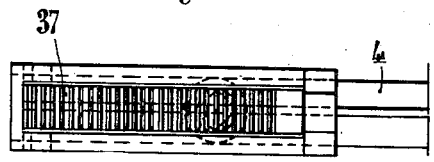

The member 22 is stretched at the front and rear by means of the bearing blocks 31 and 32 slidable in the slideways 33 and 34 in the frames 4 and 5, the bearing blocks being adjustable by means of the threaded rods 35 and 36 disposed thereon. Each of the said bearing blocks is provided with a safety brake formed by a rack 37 (Figs. 8 and 9) pivoted to a pintle 38, the teeth whereof engage the teeth of the corresponding rack 39 carried by the bearing block, the rack 37 being held in engagement by means of a set screw 40.

The front or steering wheels are mounted upon an axle 41 (Figs. 3 and 4) and connected by a bar 42, the steering devices which are disposed in the usual manner being actuated by means of a rod 45 sliding in the guide members 46 and controlled by a steering wheel 47. The universal joint 44 is disposed in the same axis as the front axle 3 having pivoted thereto the wheels 7 and the carrying member 5, thus allowing this set of wheels to be displaced with reference to the vehicle frame.

The springs 48 and 49 mounted on the axles 2 and 3 and secured in any suitable manner to the wheels 9 and 12 provide for the elasticity of the suspension when the tractor is running upon wheels. The said springs move pivotally respectively upon the axles 2 and 3 at the same time as the assemblages carrying the wheels, and when the latter come in contact with the ground, the front end of the spring 48 of the rear wheel is engaged by a strap 50 pivoted to a shaft 51 disposed on the vehicle frame 1, while the spring 49 of the front wheel engages with a like strap 52 pivoted to the shaft 53. The two straps 50 and 52 may be connected together by means of a bar 54, their angular movement being controlled by a lever 55 within reach of the driver and actuating a rod 56 connected to the strap 50. This method affords a means of bringing the straps into the engaging position for running upon wheels and of removing them out of the way during the change over from the use of wheels to the use of the chain members.

When the tractor is running upon endless chains, the front wheels are held in the raised position by means of the catch pieces 57 mounted upon straps secured to the front part of the vehicle frame 1. The said catch pieces are released, in order to disengage the wheels, by means of a rod 58 actuated by a pedal 59 or like device.

The hereinbefore described members such as endless chains, wheels and wheel carriers, are duplicated on each side of the vehicle frame, and each of the actuating device levers or rods effects a simultaneous movement of the members of the said nature connected thereto. In case the tractor is running upon endless chains as shown in Fig. 1 and should it be desired by reason of the nature of the ground to substitute wheels for the chains, all that is required is to place before each chain an obstacle or preferably a special wedge shaped block 60 (Fig. 10) and to continue the forward movement whereby the tractor shall pass on to the said obstacle.

The different positions assumed by the wheel trucks with reference to the vehicle frame and the ground when clearing the obstacle will permit of passing from the position shown in Fig. 1 to that shown in Fig. 2. The contrary movement is carried out by causing the front wheels to move over the obstacle and to clear the same, and when this has been effected, the chain now rests upon the obstacle whose height is such that the wheels no longer engage the ground.

When the straps 50 and 52 are disengaged from the springs, the wheels, in passing over the obstacle, are locked in position by the catch member 57, thus holding the wheels away from the ground.

Moreover, the driving wheels, instead of being mounted on the same shaft as the sprocket wheels 20, can be mounted as shown in Figs. 11 and 12 upon an independent axle 61 carried by an arm 62 secured to the wheel truck 6. The movement of the engine which is transmitted to the rear axle 2 is conveyed by chains to the sprockets 20 or to the driving wheels 9 by means of a chain 63 connecting the driving pinion to a sprocket wheel 64 secured to the shaft 61 of the driving wheels.

It will be observed from the foregoing considerations that the tractors thus constituted possess numerous advantages. They are enabled to travel as desired either upon caterpillars in case of loose or muddy ground or upon wheels when the soil is hard and dry, as for instance upon roads. The change from one of these methods to the other is carried out in an instantaneous and automatic manner as already set forth, by the simple use of wedge shaped blocks placed in front of the tractor.

On the other hand, the driving wheels can be disposed upon the same shaft as the sprocket wheels of the caterpillar members, and all the driving members can now be common to the two methods of travel. Moreover, the diameter of the wheels being larger than that of the gear or sprocket wheel the speed of travel upon wheels on the road will be greater than in the case of endless tracks employed on ground of variable nature, for a given speed of the engine and the driving devices.

The special shape given to this shoe is such as to afford a space between the shoe and the underside of the link, and this space is still further increased due to the greater width of the shoe relative to the link, thus affording free access to the parts of the traction chains for cleaning or other purpose. A further advantage in the construction and arrangement of the shoes resides in the prevention of accumulations of mud and the like in the sprocket tooth receiving openings of the links which might tend to prevent entry of the sprocket teeth and interfere with the propulsion of the vehicle. The shoe does not present on the outside any inwardly directed sharp angles which might retain mud and dirt.

Having now described the nature of our said invention and the best means we know of carrying the same into practical effect, we claim:

1. In a tractor, a frame, tractor chains, trucks movable about horizontal axes in the frame and supporting the chains, drive wheels mounted on certain of the trucks, steering wheels carried by other of the trucks, means to secure the trucks in position to maintain the drive and steering wheels in ground engaging position, manually operable steering means associated with the steering wheels, means operating to maintain the traction chains in ground engaging position when the drive and steering wheels are moved to inoperative position.

2. In a tractor, a frame, tractor chains, trucks movable about horizontal axes in the frame and supporting the chains, drive wheels mounted on certain of the trucks, steering wheels carried by other of the trucks, means to secure the trucks in position to maintain the drive and steering wheels in ground engaging position, manually operable steering means associated with the steering wheels, means operating to maintain the traction chains in ground engaging position when the drive and steering wheels are moved to inoperative position, and means maintaining the traction chains in engagement with the chain supporting trucks when the drive and steering wheels are moved to operative load engaging position.

3. In a tractor, a chassis, tractor chains, trucks mounted to pivot about horizontal axes in said chassis and supporting said chains, drive wheels carried by one of the trucks, steering wheels carried by the other truck, means to angularly displace the rolling plane of the steering wheels, and means to fix the trucks in different positions.

4. In a tractor, a chassis, tractor chains, trucks mounted to pivot about horizontal axes in said chassis and supporting said chains, drive wheels carried by one of the trucks, steering wheels carried by the other truck, said trucks being movable on the horizontal axes to dispose the drive and steering wheels in ground engaging position, means to lock the trucks with the drive and steering wheels in ground engaging position, controlling means for the steering wheels, and flexible connecting means connecting the steering wheels with the controlling means permitting displacement of the truck carrying said steering wheels about its horizontal axis.

In testimony whereof we have signed our names to this specification in the presence of a subscribing witness.

ALBAN DE VIREL.
MARCEL EUGÈNE CAHEN.

Witness:
CLEMENT S. EDWARDS.